United States Patent [19]
Boggs, III

[11] Patent Number: 5,898,249
[45] Date of Patent: *Apr. 27, 1999

[54] NO SLIP EDDY CURRENT DRIVE

[76] Inventor: Paul D. Boggs, III, 8265 Lupine Cir., Fort Worth, Tex. 76135

[ * ] Notice: This patent issued on a continued prosecution application filed under 37 CFR 1.53(d), and is subject to the twenty year patent term provisions of 35 U.S.C. 154(a)(2).

[21] Appl. No.: 08/663,990

[22] Filed: Jun. 14, 1996

[51] Int. Cl.$^6$ .......................... H02K 49/00; H02K 49/04
[52] U.S. Cl. .......................... 310/105; 310/92; 310/103; 192/84.1; 192/84.7; 464/29
[58] Field of Search .................... 310/103, 105, 310/92, 96, 101, 75 D, 76, 77, 106; 192/54.4, 53.2, 84.1, 84.2, 84.51, 84.7, 18 B, 48.2; 464/29

[56] References Cited

U.S. PATENT DOCUMENTS

| 2,317,135 | 4/1943 | Crittenden et al. | 192/48.2 |
|---|---|---|---|
| 2,584,116 | 2/1952 | Duyck | 192/53 |
| 2,940,570 | 6/1960 | Thielmann | 192/53 |
| 4,788,463 | 11/1988 | Layh | 310/77 |
| 5,434,461 | 7/1995 | Boggs, III | 310/105 |

FOREIGN PATENT DOCUMENTS

| 4207710 | 9/1993 | Germany | 310/103 |

Primary Examiner—Nestor Ramirez
Assistant Examiner—Karl I. E. Tamai
Attorney, Agent, or Firm—Geoffrey A. Mantooth

[57] ABSTRACT

A variable speed eddy current drive has a driven member and an output member. The driven member is structured and arranged to be coupled to a motor shaft. The output member is structured and arranged to be coupled to a load. The drive also has an armature and an electromagnet. The armature is coupled to either the driven member or the output member, while the electromagnet is coupled to the other of the driven member or the output member. The drive is provided with a coupler that is in addition to the armature and the electromagnet. The coupler is selectively operable between a coupled position and an uncoupled position. Actuating the coupler to the coupled position causes the output member to rotate at the same speed as the driven member, with no slip between the two members. The coupler can be actuated between the coupled and uncoupled positions while the drive is rotating. The coupler can be actuated to move either axially or radially.

11 Claims, 4 Drawing Sheets

NO SLIP EDDY CURRENT DRIVE

FIELD OF THE INVENTION

The present invention relates to variable speed drives, and in particular to eddy current drives.

BACKGROUND OF THE INVENTION

There are many applications where it is desirable to have a fixed speed motor provide a variable speed output. For example, in ventilation systems, an ac synchronous motor is used to rotate an air mover, such as a fan. The energy efficiency of this system increases if the speed of the motor remains fixed while the speed delivered to the fan can be varied.

An eddy current drive located between the motor and the load provides such a variable speed capability. The eddy current drive has a driven member that is coupled to the output shaft of the motor. The eddy current drive also has an output member that is coupled to the fan (or other load such as a pump). The output member is typically coupled to the fan by one or more belts. The eddy current drive has an armature coupled to one of the driven or output member and an electromagnet coupled to the other of the driven or output members.

The driven member is rotated at the same speed as the motor shaft. To rotate the output member (and thus the fan), electrical current is applied to the electromagnet. The electromagnet moves relative to the armature and thus varies the magnetic flux in the armature. This induces eddy currents in the armature, wherein the armature is electromagnetically coupled to the electromagnet and the output member rotates. The higher the current provided to the electromagnet, the faster the output member rotates.

The drive permits a variable amount of slip between the driven member and the output member. With no current applied to the electromagnet, the drive operates at full slip, wherein the output member does not rotate, even though the driven member rotates at motor shaft speed. As the amount of current applied to the electromagnet increases, the amount of slip decreases. This is because the speed of the output member approaches the speed of the driven member. However, even with full current applied to the electromagnet, there is still some slip between the driven member and the output member. This is because with electromagnetic coupling, the output member is unable rotate at the same speed as the driven member and the motor shaft. Instead, the output member rotates at some lesser speed with respect to the driven member.

The load produced by the fan (or pump) varies with respect to speed. For example, the faster the fan spins, the more air that is being pushed by the fan. Therefore, more power is needed to rotate the fan at faster speeds.

There are some applications where the load is rotated at full speed for relatively long periods of time. Because there is some slip in the eddy current drive at full speed, there is a loss of efficiency at full speed. As a result, in prior art systems, one or more components (motor, fan, pump) must be oversized to compensate for this loss of efficiency. Such oversizing increases the cost of the system.

In other prior art systems, the output member can be mechanically coupled to the driven member by an operator. This mechanical coupling rotates the output member at the same speed as the driven member. To mechanically couple (or lockup) the output member to the driven member, the motor must be stopped. After stopping the motor, an operator performs the mechanical coupling by tightening set screws between the drum and the electromagnet. The motor is then restarted. To return to variable speed operation, the motor is again stopped and the operator mechanically uncouples the output and driven members. Unfortunately, flexibility is lost with this manual coupling technique. Many systems (such as HVAC (heating, ventilation and air conditioning), pumps) that utilize eddy current drives are designed to be automatic in operation. However, this manual intervention defeats the goal of automatic operation because the motor must be stopped to mechanically couple or uncouple the driven and output members. In addition, such manual intervention is often impractical because an operator is not available to lockup or unlock the drive.

SUMMARY OF THE INVENTION

It is an object of the present invention to provide an eddy current drive that provides full speed with no slip to its output member.

It is a further object of the present invention to provide an eddy current drive that rotates its output member at variable speeds ranging from zero to full speed at no slip, while the eddy current drive is rotating.

The present invention provides a variable eddy current drive that includes a driven member, an output member, an armature, and an electromagnet. The driven member is structured and arranged to be coupled to a motor shaft. The output member is structured and arranged to be coupled to a load. The armature is coupled to one of the driven member or the output member. The electromagnet is coupled to the other of the driven member or the output member. The electromagnet is separated from the armature by a gap.

The drive also includes a coupler that is in addition to the armature and the electromagnet. The coupler is selectively operable between a coupled position and an uncoupled position. The coupler is coupled to either of the driven member or the output member. When the coupler is in the coupled position, the driven member is fixedly coupled to the output member so that the driven member rotates in unison with the output member. When the coupler is in the uncoupled position, the driven member is rotatably coupled to the output member so that the driven member rotates relative the output member. The drive also has an actuator that moves the coupler between the coupled and uncoupled positions while the driven member is rotating.

With the drive of the present invention, the output member can be mechanically coupled or locked to the driven member while the drive is rotating. This allows for full automatic operation. The motor, and thus the drive need not be stopped to coupled and uncouple the output member to the input member.

The drive of the present invention also allows the components of the system (which include the motor, the drive, and the load itself) to be more accurately sized. These components need not be oversized to compensate for a loss of efficiency. Because the components are more accurately sized, a less expensive system can be utilized.

In one aspect of the present invention, the coupler comprises teeth that are received by recesses. The teeth are on one of the driven member or the output member, while the recesses are on the other of the driven member or the output member.

In another aspect of the present invention, a high friction surface is used to couple the output member and the driven member together when the coupler is in the coupled position.

In still another aspect of the present invention, the coupler moves in a direction which is parallel to the axis of rotation of the driven member when the coupler moves between the coupled and uncoupled positions. In still another aspect of the present invention, the coupler moves from the uncoupled position to the coupled position in a direction that is radially outward from an axis of rotation of the driven member.

In still another aspect of the present invention, the actuator comprises an actuator electromagnet.

A method of operating a variable speed eddy current drive is provided. The drive has a driven member that is structured and arranged to be coupled to a motor shaft. The drive also has an output member that is structured and arranged to be coupled to a load. The drive has an armature that is coupled to one of the driven member or the output member and an electromagnet that is coupled to the other of the driven member or the output member. The electromagnet is separated from the armature by a gap.

The driven member is rotated at a first speed. The electromagnet is energized so as to rotate the output member at a speed that is less than the first speed. While the driven member is rotating, the output member is mechanically coupled to the driven member, such that the output member rotates at the first speed.

DESCRIPTION OF THE PREFERRED EMBODIMENT

Figure 1:
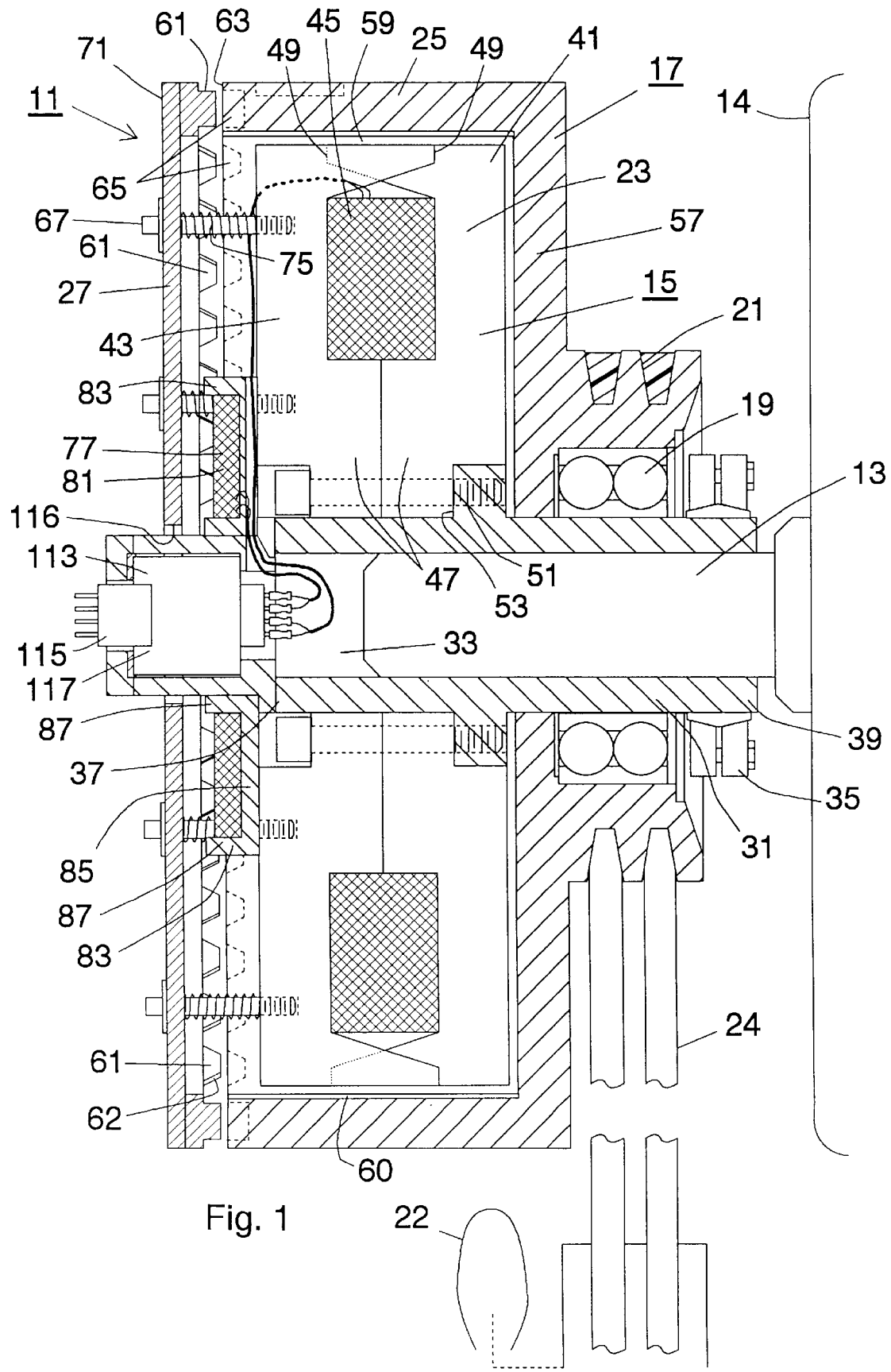
FIG. 1 is a cross-sectional side view of the eddy current drive of the present invention, in accordance with a preferred embodiment.

In FIG. 1, there is shown a cross-sectional view of an eddy current drive 11 of the present invention, in accordance with a preferred embodiment. The drive 11 is mounted onto a motor shaft 13 of a motor 14. The drive 11 will be described in general terms, followed by a more specific description.

The drive 11 has a driven member 15, which is rotated by the motor shaft 13. The drive also has an output member 17, which is mounted on the driven member 15 by way of bearings 19. The output member 17 includes sheaves 21. The sheaves 21 are coupled to a load, such as a fan 22, by way of belts 24.

The driven member 15 includes an electromagnet 23, while the output member 17 includes an armature 25. The electromagnet 23 rotates at the same speed as the motor shaft 13. Current is provided to the electromagnet 23 in order to cause the output member 17 to rotate. By providing electrical current to the electromagnet 23, the output member 17 becomes electromagnetically coupled to the driven member 15. Such electromagnetic coupling is conventional and is disclosed in U.S. Pat. No. 5,446,327, the disclosure, including the specification and drawings, of which is incorporated herein by reference.

Even when the output member 17 is fully coupled electromagnetically to the driven member, there is some slip between the two members when the output member is connected to a load. The output member 17 rotates at a speed that is less than the speed of the driven member 15 (and also of the motor shaft 13).

In addition to electromagnetic coupling, the present invention mechanically couples the output member to the driven member in a selective manner. A coupler 27 is used to achieve the mechanical coupling. Thus, when the output member 17 is mechanically coupled to the driven member 15, the output member rotates at the same speed as the driven member and the motor shaft 13. There is no slip between the output member and the driven member. The drive 11 therefore operates at 100% efficiency.

The mechanical coupling can be selected or deselected either manually or automatically.

Now, the specifics of the drive 11 will be discussed. The driven member 15 has a hub 31. The hub is generally in the form of a sleeve. The hub 31 has a cylindrical cavity 33 therein for receiving the motor shaft 13. The hub 31 is coupled to the motor shaft 13 by a conventional and commercially available compression type shrink disk 35. Alternatively, the cavity can be keyed or threaded to receive respective keys or threads on the motor shaft. The hub has an outer end portion 37 and an inner end portion 39 (with "outer" being referenced as further from the motor and "inner" being referenced as closer to the motor).

The driven member 15 also includes the electromagnet 23. The electromagnet 23 is mounted adjacent to the outer end portion 37 of the hub 31. The electromagnet 23 includes two pole pieces 41, 43 and the drive coil 45. There is an inner pole piece 41 and an outer pole piece 43. Each pole piece is made of annular portion 47 that extends around the hub 31. Poles 49 extend from the outside diameter of the annular portion. The poles 49 of an individual pole piece are spaced apart by gaps. When the pole pieces are assembled as shown in FIG. 1, the poles of the inner and outer pole pieces 41, 43 are interdigitated so as to form alternating polarities around the circumference of the assembly of the pole pieces. The drive coil 45 is located inside of the assembled pole pieces 41, 43. The pole pieces and the coil extend around the circumference of the hub. The pole pieces are secured to the hub by bolts 51. The hub has a circumferential shoulder 53 that extends radially outward to receive the bolts and to position the pole pieces on the hub. The inner pole piece 41 abuts against the shoulder 53. The pole pieces are made from a low carbon steel which is magnetic, so as to provide a path for a magnetic field.

A fan (not shown) is coupled to the outer end of the outer pole piece 43. The fan has openings therein so as to cause air to circulate through the pole pieces and across the armature.

The output member 17 includes the sheaves 21 that are mounted the hub 31 by way of the bearings 19. The sheaves 21 are located around the inner end portion 39 of the hub so as to be close to the motor. By positioning the sheaves close to the motor, the overhung load produced by the drive in the motor shaft is reduced.

The output member 17 also includes the armature 25. The armature 25 is coupled to the sheaves 21 by a radially extending wall 57. The wall 57 has openings therethrough to allow air circulation through the interior of the drive. The armature 25 is a hollow cylinder and is made of a material that is high in conductivity and permeability. The armature 25 is separated from the pole pieces 41, 43 by a gap 59, wherein the driven member and output member can rotate freely and without any mechanical interference from each other. The sheaves 21, the wall 57, and the armature 25 form an integral assembly. As an alternative, a second material 60 can be located on the inside diameter of the armature 25. For example, an interior sleeve can be press fit into the inside diameter of the armature. The interior sleeve is made of a material that is suitable for the production of eddy currents (high conductivity, high permeability). Likewise, the material can be a superconductor that is applied to the inside surface of the armature. The armature around the material dissipates heat.

The driven member 15 is mechanically coupled to the output member 17 by way of the coupler 27. In the drive of FIG. 1, the coupler 27 is a plate. The plate is made of a magnetic material such as low carbon steel. Along the outer periphery of the plate 27 are teeth 61. The teeth 61 extend in a direction that is parallel to the axis of rotation of the hub. The teeth 61 are located on the inner side of the plate 27, so as to extend towards the armature 25. The outer end 63 of the armature 25 has recesses 65 for receiving the teeth 61.

The plate 27 is coupled to the outer pole piece 43 by way of bolts 67. The heads of the bolts 67 are located on the outer side 71 of the plate 27. The threaded end of each bolt 67 is received by a threaded bore in the outer pole piece 43. A helical spring 75 is located around the shank of each bolt.

There is provided a lockup electromagnet 77, coupled to the outer pole piece 43 by way of bolts (not shown). The lockup electromagnet 77 is interposed between the coupler plate 27 and the outer pole piece 43. The lockup electromagnet 77 includes a lockup coil 81 and a coil mount 83. The lockup coil 81 is annular. The coil mount 83 has a radially extending wall 85. At both the inside radius end and the outside radius end of the coil mount are axially extending poles 87. The poles 87 extend toward the coupler 27. In cross-section as shown by FIG. 1, the coil mount looks like two "]".

The coupler plate 27 rotates in unison with the driven member. This is because the coupler is coupled to the driven member by the bolts 67. The coupler plate is able to move along the rotational axis of the drive.

The lockup electromagnet 77 actuates the coupler plate 27 between an uncoupled position and a coupled position. The uncoupled position is shown in FIG. 1. In the uncoupled position, the teeth 61 are not engaged with the armature recesses 65. In fact, the coupler 27 rotates without contacting the armature 25. To rotate the output member 17 in the uncoupled position of the coupler, electrical current is provided to the drive coil 45 so as to as to electromagnetically couple the output member 17 to the driven member 15.

To move the coupler 27 from the uncoupled position to the coupled position, electrical current is provided the lockup coil 81. The magnetic field formed by the lockup electromagnet 77 pulls the coupler plate 27 axially closer to the lockup electromagnet, wherein the teeth 61 of the coupler plate 27 are received by the recesses 65 in the end of the armature. The teeth 61 have surfaces 62 which bear against the recesses in the armature. The output member 17 is thus mechanically coupled to the driven member 15. The sheaves 21 rotate at the same speed as the motor shaft 13.

When electrical current is no longer provided to the lockup coil 81, the springs 75 force the coupler plate 27 back to the uncoupled position, wherein the teeth 61 disengage from the recesses 65 of the armature 25. The driven member 15 thus becomes mechanically uncoupled from the output member 17.

The teeth 61 of the coupler plate 27 and the corresponding recesses 65 of the armature can be a variety of sizes and shapes. In FIG. 1, the teeth are shown as being trapezoidal, but the teeth could be square or rounded. The recesses could correspond to the size and shape of the teeth, or alternatively, the recesses could be longer in circumference than the teeth.

Figure 2:
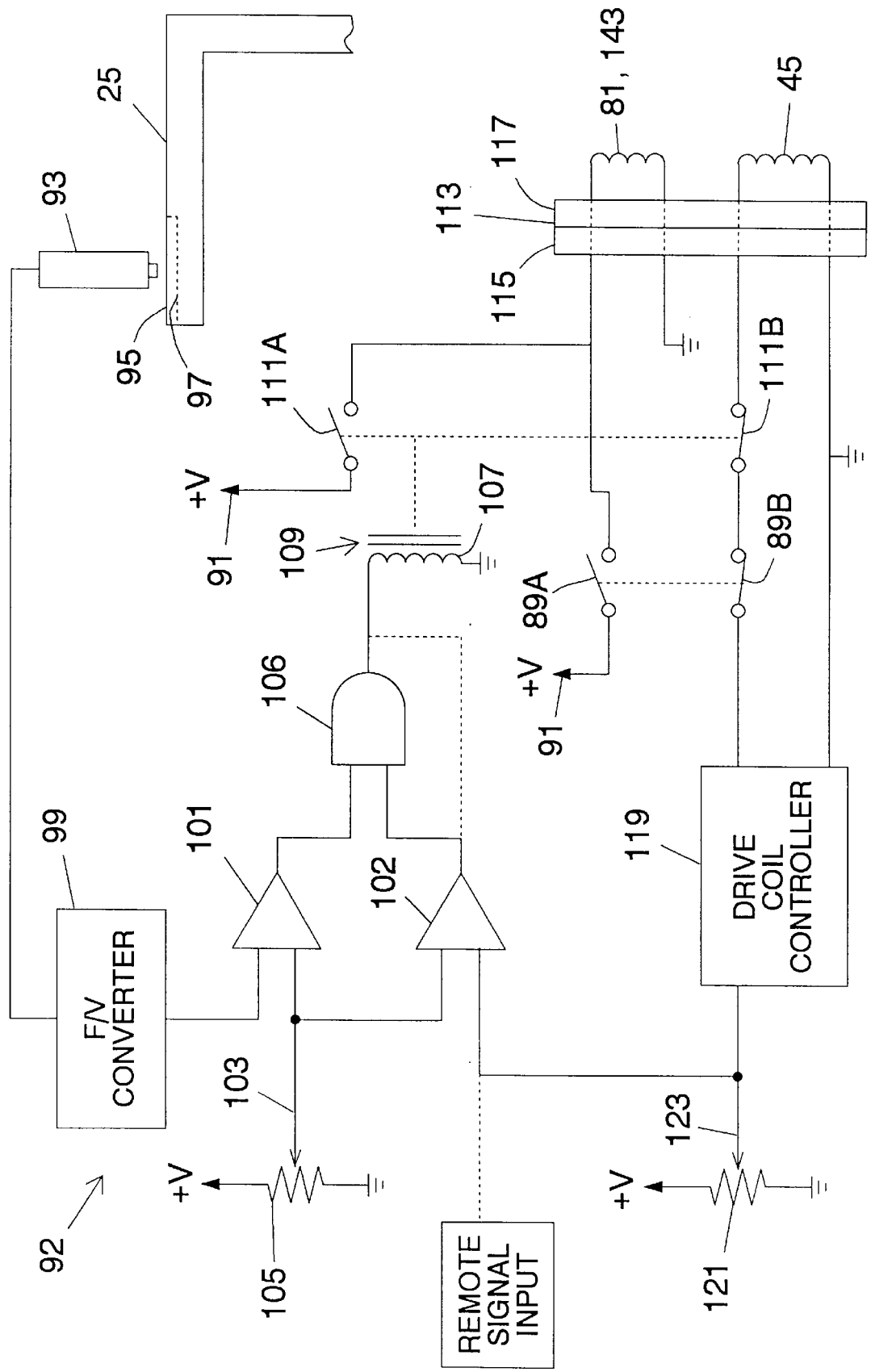
FIG. 2 is a schematic electrical diagram of the circuit of the drive of the present invention.

The electrical schematic for the drive is shown in FIG. 2. The lockup coil 81 can be energized either manually or automatically. For manual operation, a switch 89A is provided to connect and disconnect the lockup coil 81 and a power supply 91. There is also provided switch 89B, which is connected between a controller 119 and the drive coil 45. The controller 119 controls the energization of the drive coil.

When the switch 89A is closed, the power supply 91 energizes the lockup coil 81. As the switch 89A is closed, the switch 89B (which is ganged to switch 89A) opens. Thus, the drive coil 45 is disconnected from the controller in order to conserve energy. As the switch 89A opens, the switch 89B closes.

Automatic operation uses a control circuit 92. Various inputs can be provided to the control circuit. One such input is a speed sensor 93. The speed sensor 93 provides an output that is indicative of the speed of the output member 17. The speed sensor 93 is a magnetic pulse pickup that is positioned close to the armature 25. The armature is provided with alternating peaks 95 and valleys 97 (or grooves). The speed sensor 91 is stationary with respect the rotating armature 25.

The output of the speed sensor 93 is connected to a frequency-to-voltage converter 99. As the armature 25 rotates faster, the output voltage of the frequency-to-voltage converter 99 increases. Conversely, as the armature rotates more slowly, the output voltage of the frequency-to-voltage converter 99 decreases.

The output of the frequency-to-voltage converter 99 is connected to an input of a first comparator 101. The other input of the first comparator 101 is connected to a wiper arm 103 of a potentiometer 105. The ends of the potentiometer 105 are connected between a fixed voltage source and ground.

This potentiometer 105 sets the threshold speed for energizing the lockup coil 81.

The wiper arm 103 is also connected to an input of a second comparator 102. The other input of the second comparator 102 is connected to the wiper arm 123 of a command speed potentiometer 121. The command speed potentiometer also provides an input into the controller 119 for the drive coil 45.

The outputs of the first and second comparators 101, 102 are connected to respective inputs of an AND gate 106. The output of the AND gate 106 is connected to the coil 107 of a relay 109. The relay has a normally open switch 111A that is opened and closed by the relay coil 107. One terminal of the switch 111A is connected to a voltage source 91. The other terminal of the switch 111A is connected to one end of the lockup coil 81. The other end of the lockup coil 81 is connected to ground. Ganged with the switch 111A is a normally closed switch 111B. The switch 111B is connected in series with the switch 89B. As the switch 111A closes, the switch 111B opens. Likewise, as the switch 111A opens, the switch 111B closes. The switch 111B disconnects the controller 119 from the drive coil 45 during lockup in order to conserve energy.

Power transistors could be used in place of the relay 109.

The lockup coil is connected to the relay 109 and to ground by a rotary electrical coupling 113. The rotary electrical coupling 113 could be of the brush type, wherein carbon brushes (or some other type of brushes) and slip rings are utilized. Alternatively, the rotary electrical coupling 113 could be of the brushless type, wherein a liquid (such as mercury) coupling or an inductive coupling is utilized. Such rotary electrical couplings are described in U.S. Pat. No. 5,446,327. The rotary electrical coupling has a stationary portion 115 (connected to the relay and to ground) and a rotary portion 117 (connected to the lockup coil) that rotates with the drive. The rotary portion 117 is coupled to the particular drive member or output member having the lockup coil. For example, in the drive shown in FIG. 1, the rotary portion is coupled to the outer end portion of the hub 31.

The coupler plate 27 has an opening 116 for receiving the rotary electrical coupling 113.

The drive coil 45 is connected to the controller 119 by way of the rotary electrical coupling 113 (or alternatively by a separate rotary electrical coupling). The controller 119 is conventional and commercially available. The controller 119 is connected to the wiper arm 123 of the potentiometer 121, which is used to set the speed of the drive. The controller 119 regulates the amount of electrical power that is provided to the drive coil 45 so as to regulate the magnetic coupling between the driven member and the output member. The controller 119 can operate either in an open loop configuration (with no feedback) or in a closed loop configuration (with feedback, such as from the speed sensor 93).

The automatic operation of the drive 11 will now be described. The motor shaft 13 rotates the driven member 15. When the coupler 27 is in the uncoupled position, the drive coil 45 is energized by the controller 119 to rotate the output member 17. Energizing the drive coil magnetically couples the armature 25 to the electromagnet 23 and thus magnetically couples the output member 17 to the driven member 15.

To increase the speed of the output member 17, the electrical current of the drive coil 45 is increased. This can be accomplished, for example, by providing more voltage from the potentiometer 121 as an input to the controller 119. When the output member 17 reaches a threshold speed, the lockup coil 81 is energized. The threshold speed is set by the wiper arm 103 (FIG. 2) of the potentiometer 105. For example, if the motor shaft rotates at 1800 rpm, the threshold speed can be set to 1600 rpm. Thus, when the output member 17 is rotating at some speed that is less than 1600 rpm, the coupler 27 is disengaged from the output member. The speed of the output member 17 is monitored by the speed sensor 93. When the drive coil 45 is provided with sufficient current to rotate the output member 17 at some speed above the threshold speed, then the first comparator 101 and the second comparator 102 both produce high outputs, wherein the relay switch 111A is closed and the lockup coil 81 is automatically energized. The coupler 27 engages the output member 17, wherein the speed of the output member matches the speed of the motor shaft. The current to the drive coil 45 is interrupted by the opening of the switch 111B.

The coupler 27 is automatically disengaged when the drive is commanded to slowdown. For example, less voltage is provided by the potentiometer 121. This causes the output of the second comparator 102 to go low, wherein the relay switch 111A opens. The lockup coil 81 is deenergized, and coupler moves axially back to the disengaged position. The speed of the output member 17 is again controlled by the drive coil 45.

The coupler 27 can be actuated while the motor shaft is still rotating. Thus, to operate the drive in a no slip condition, the motor 14 need not be stopped to actuate the coupler. Likewise, the motor need not be stopped to deactuate the coupler and convert the drive from no slip operation to slip operation.

In lockup controller 92, it is preferable to provide hysteresis to avoid erratic operation of the lockup coil 81. The lockup coil is energized at a slightly higher speed than is the speed at which it is deenergized.

One alternative to the lockup controller 92 of FIG. 2 is shown by a dashed line from the output of the comparator 102 to the relay coil 107. In this configuration, the speed sensor 93, the first comparator 101, and the AND gate 106 are not utilized. Instead, the relay is controlled by the two potentiometers 105, 121.

In another alternative, the potentiometer 121 is not connected to the comparator 102. Instead, a remote signal input (shown by dashed lines in FIG. 2) is connected to the comparator 102. The remote signal input is independent of the command speed potentiometer 121.

Figure 3:
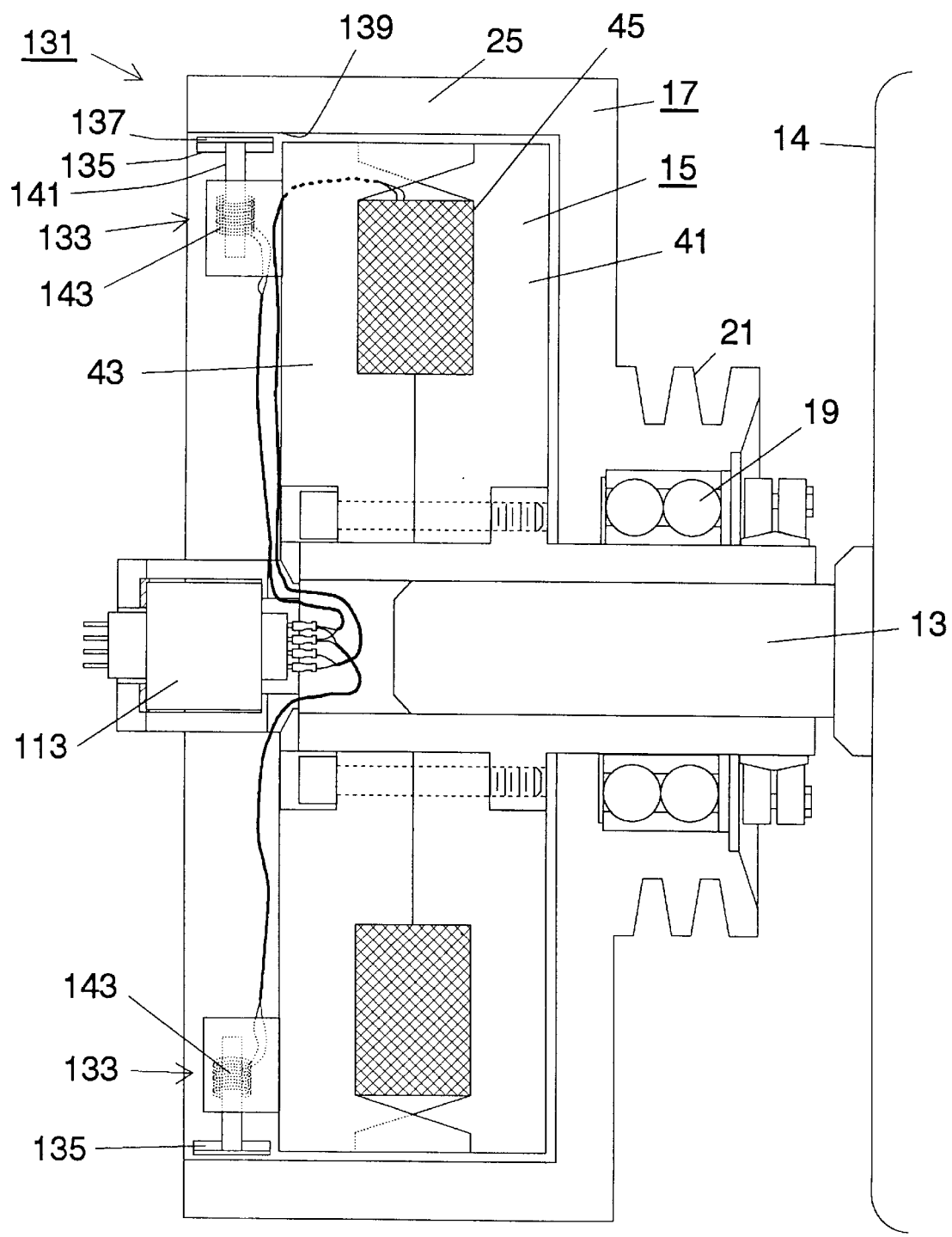
FIG. 3 is a cross-sectional side view of the eddy current drive of the present invention, in accordance with another embodiment.

In FIG. 3, there is shown a drive 131, in accordance with another embodiment. In this embodiment, the drive 131 is similar to the drive 11 of FIG. 1, except for the coupler. The coupler 133 includes plural shoes 135. Each shoe 135 is arcuate so as to correspond to the curvature of the inside diameter of the armature. A high friction material 137, such as a brake lining, is provided between the armature commercially available, being in used in the automotive industry. The brake lining can be on each shoe, or in the alternative, the brake lining can be on the inside surface 139 of the armature outer end portion. Each shoe 135 is coupled to a stem 141. The stem 141 is received by a solenoid actuator 143. The solenoid 143 is mechanically coupled to the outer pole piece 43. The solenoid 143 is electrically coupled to the circuit of FIG. 2 by way of the rotary coupler 113.

The shoes 135 are actuated so as to move radially in and out. When the solenoid 143 is not energized, the shoes are in a disengaged position, shown in FIG. 3, wherein no contact is made between the shoes and the armature. When the solenoid 143 is energized, the shoes extend radially outward and engage the inside surface of the armature, wherein the output member and the driven member rotate in unison. Upon deenergization of the solenoid, the shoes are retracted radially inward to disengage from the armature.

Figure 4:
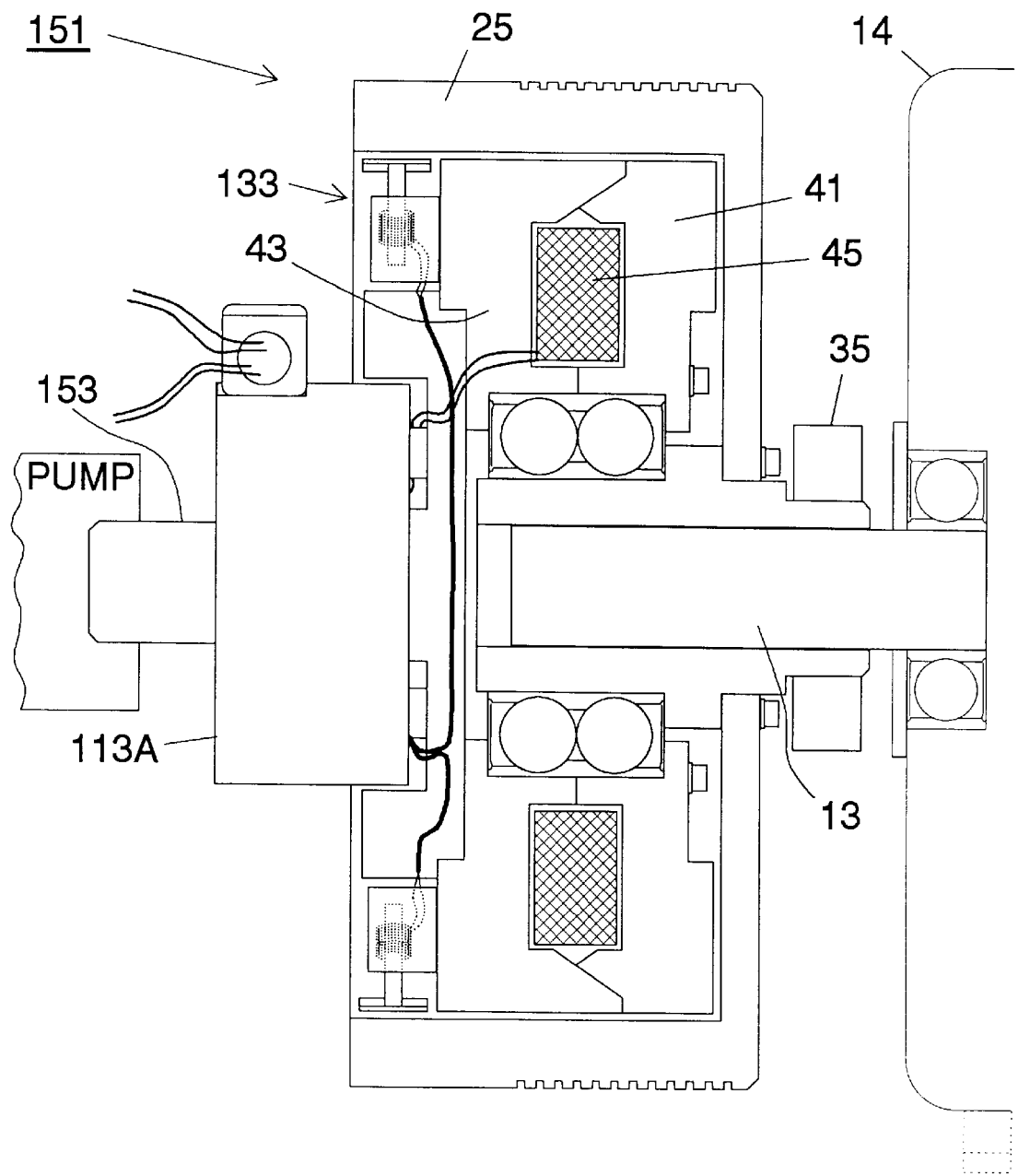
FIG. 4 is a cross-sectional side view of the eddy current drive of the present invention, in accordance with still another embodiment.

In FIG. 4, there is shown a drive 151 of the present invention, and in accordance with yet another embodiment. The drive 151 is similar to the drive 131 of FIG. 3. However, instead of having sheaves 21 on the output member, the drive of FIG. 4 shows an output shaft 153 as part of the output member. This type of drive is referred to as a shaft in shaft out and is used to operate a pump. The rotary electrical coupling 113A allows the output shaft to go therethrough. The coupler plate 27 shown in FIG. 1, along with the lockup electromagnet 77, can be used as the coupler in the drive 151 of FIG. 4.

The coupler plate 27 of the drive of FIG. 1 need not utilize teeth to engage and rotate the output member. Instead, a brake lining (or other frictional material) could be used to cause the coupler to engage and rotate the output member. Likewise, the shoes of the drives of FIGS. 3 and 4 need not utilize frictional materials to engage and rotate the output member. Instead, the shoes could utilize teeth that engage recesses in the inside surface of the armature. Other mechanisms for engaging the coupler with the output member could be utilized besides teeth and frictional materials.

Although the drive has been described as coupling the electromagnet to the driven member and the armature to the output member, the armature could be coupled to the driven member and the electromagnet could be coupled to the output member. Likewise, the coupler need not be on the driven member, but could instead be on the output member. In such a configuration, the coupler would selectively engage the driven member.

Furthermore, although the drive has been described as a shaft mounted drive, the drive could be a floor mounted drive. In a floor mounted drive, the output member need not be mounted by bearings onto the driven member. Instead, the output and driven members are mounted in a housing.

The foregoing disclosure and the showings made in the drawings are merely illustrative of the principles of this invention and are not to be interpreted in a limiting sense.

I claim:

1. A shaft mounted variable speed eddy current drive, comprising:
   a) a driven member that is structured and arranged to be coupled to a motor shaft;
   b) an output member that is structured and arranged to be coupled to a load, both the driven member and the output member being structured and arranged to be supported by the motor shaft, the driven member being stationary along an axis of rotation relative to the output member;
   c) an armature that is coupled to one of said driven member or said output member;
   d) an electromagnet that is coupled to the other of said driven member or said output member, said electromagnet being separated from said armature by a gap, the gap being maintained during operation of the electromagnet, said electromagnet being magnetically coupled to said armature across the gap when said electromagnet is energized, the gap extending in a direction that is parallel to an axis of rotation of said driven member;
   e) a coupler that is coupled to one of said armature or said electromagnet and that is structured and arranged to be selectively coupled to the other of said armature or said electromagnet, the coupler being in addition to said armature and said electromagnet and being selectively operable so as to move independently of said armature and said electromagnet between a coupled position and an uncoupled position, wherein in the coupled position said driven member is fixedly coupled to said output member so that said driven member rotates in unison with said output member, and in the uncoupled position said driven member is rotatably coupled to said output member so that said driven member rotates relative to said output member, said coupler being coupled to either of said driven member or said output member when said coupler is in the uncoupled position;
   f) an actuator that selectively moves said coupler between said coupled and uncoupled positions while said driven member is rotating, said actuator being coupled to the other of said armature or said electromagnet, said actuator comprises an actuator electromagnet located adjacent to a portion of the coupler.

2. The drive of claim 1 wherein said coupler comprises teeth on one of said driven member or said output member and recesses on the other of said driven member or said output member, said recesses receiving said teeth when said coupler is in the coupled position.

3. The drive of claim 1 wherein said coupler comprises a member and a high friction surface interposed between said member and the other of said driven member or said output member that is not coupled to said coupler when said coupler is in the uncoupled position.

4. The drive of claim 1, further comprising:
   a) said actuator electromagnet is coupled to the other of said driven member or said output member;
   b) a rotary electrical coupling having rotary contacts that are mechanically coupled to the other of said driven member or said output member, and that are electrically coupled to said electromagnet and to said actuator electromagnet, said rotary electrical coupling having stationary contacts that are electrically coupled to said rotary contacts.

5. The drive of claim 1 wherein said coupler moves between the coupled and uncoupled positions in a direction that is parallel to an axis of rotation of said driven member.

6. The drive of claim 1 wherein said coupler moves from the uncoupled position to the coupled position in a direction that is radially outward from an axis of rotation of said driven member.

7. A method of operating a variable speed eddy current drive having a driven member that is structured and arranged to be coupled to a motor shaft, an output member that is structured and arranged to be coupled to a load, an armature that is coupled to one of said driven member or said output member, and an electromagnet that is coupled to the other of said driven member or said output member, said electromagnet being separated from said armature by a gap, said electromagnet being magnetically coupled to said armature across the gap when said electromagnet is energized, the gap extending in a direction that is parallel to an axis of rotation of said driven member, comprising the steps of:
   a) rotating said driven member at a first speed;
   b) energizing said electromagnet so as to rotate said output member at a speed that is less than the first speed, while maintaining the gap between the electromagnet and the armature;
   c) while said driven member is rotating, mechanically coupling said output member to said driven member, such that said output member rotates at the first speed by energizing a second electromagnet so as to move a coupler so as to engage both said driven member and said output member with said coupler, said coupler being moved independently of said driven member and said output member, the driven member and the output member being stationary along an axis of rotation of the drive.

8. The method of claim 7, further comprising the step of:
   a) sensing the speed of said output member;
   b) said step of mechanically coupling said output member to said driven member further comprises the step of mechanically coupling said output member to said driven member when said sensed speed of said output member exceeds a threshold speed.

9. The method of claim 7 further comprising the step of deenergizing said electromagnet when said output member is mechanically coupled to said driven member.

10. The drive of claim 1, further comprising:
   a) a speed sensor located adjacent to said output member;
   b) a controller having an input that is connected to said speed sensor and an output that is connected to said actuator, said controller having a threshold speed, wherein when a rotational speed of said output member, as sensed by said speed sensor, exceeds said threshold speed, said controller causes said actuator to move said coupler to said coupled position.

11. The drive of claim 1, further comprising:
   a) a switch connected in series with said electromagnet;
   b) a switch controller connected to the switch, the switch controller opening the switch when said actuator moves said coupler to said coupled position so as to deenergize said electromagnet, said controller closing said switch when said coupler is moved to said uncoupled position.

* * * * *